Figure 1:
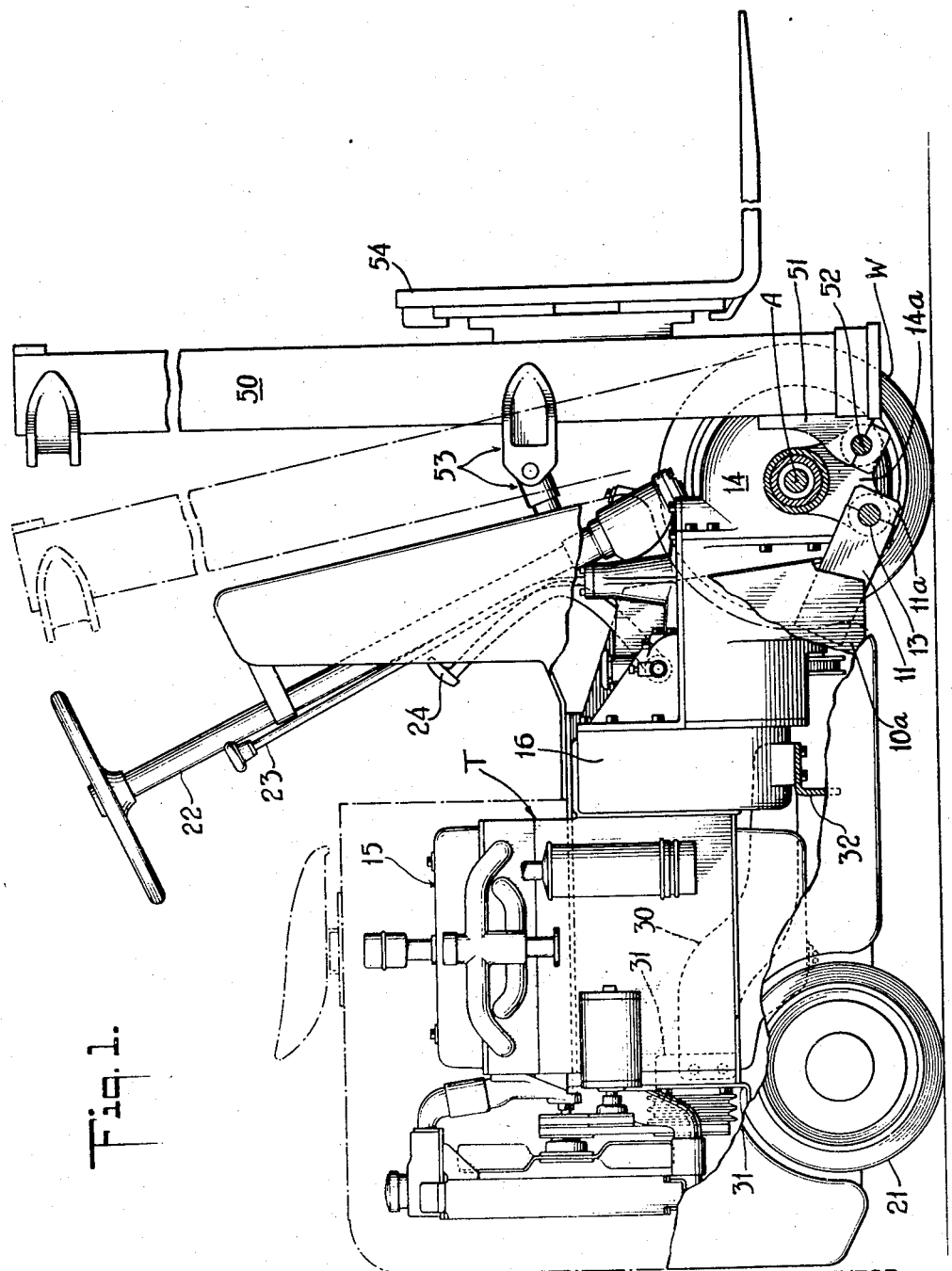

Nov. 26, 1946.  C. S. SCHROEDER  2,411,556
TRUCK
Filed Feb. 1, 1945  5 Sheets-Sheet 1

INVENTOR
C. S. Schroeder
BY
A. H. Golden
ATTORNEY

Nov. 26, 1946.  C. S. SCHROEDER  2,411,556
TRUCK
Filed Feb. 1, 1945  5 Sheets-Sheet 3

INVENTOR
C.S. Schroeder
BY
H.H. Golden
ATTORNEY

Nov. 26, 1946.  C. S. SCHROEDER  2,411,556
TRUCK
Filed Feb. 1, 1945   5 Sheets-Sheet 4
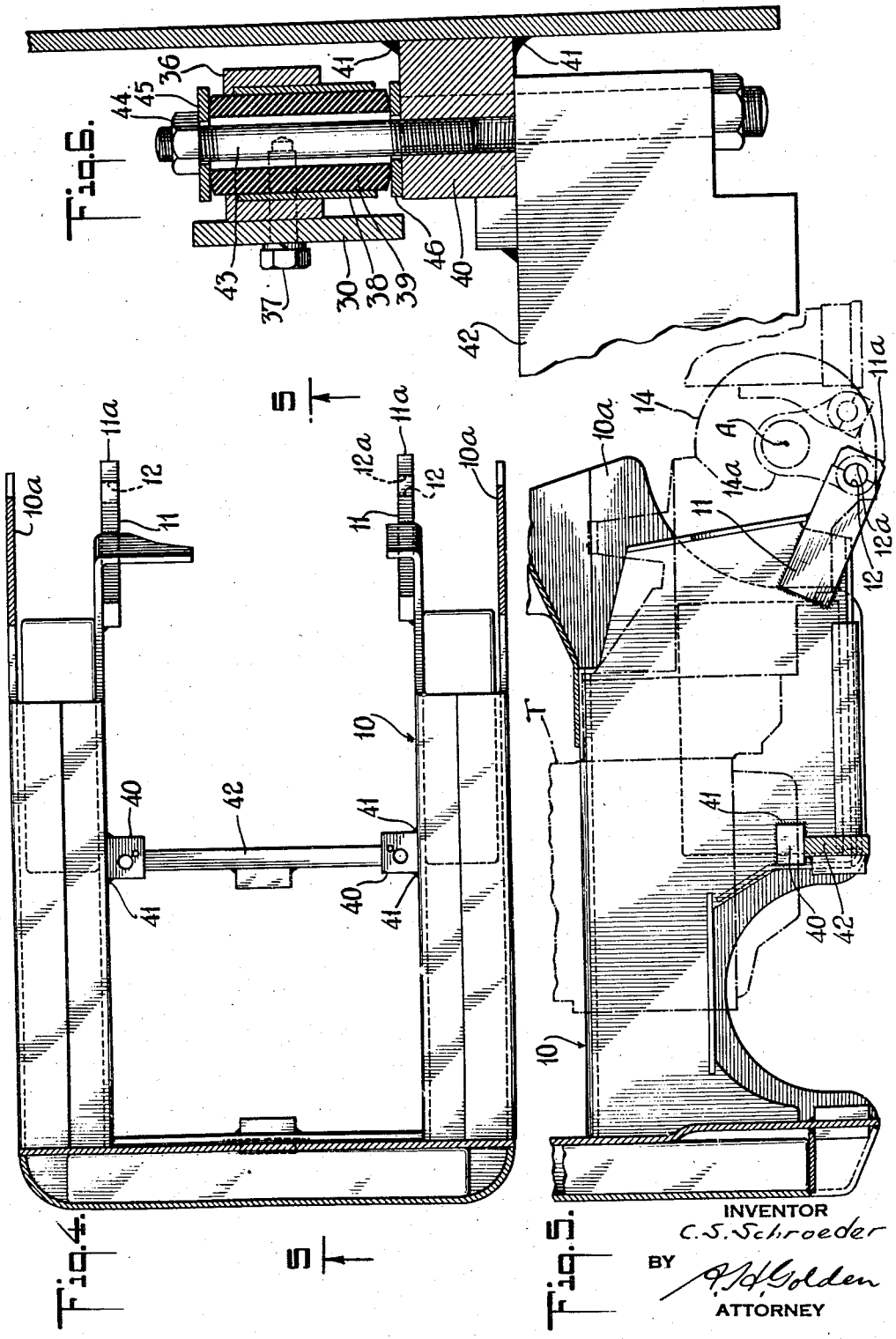
INVENTOR
C. S. Schroeder
BY
A. H. Golden
ATTORNEY

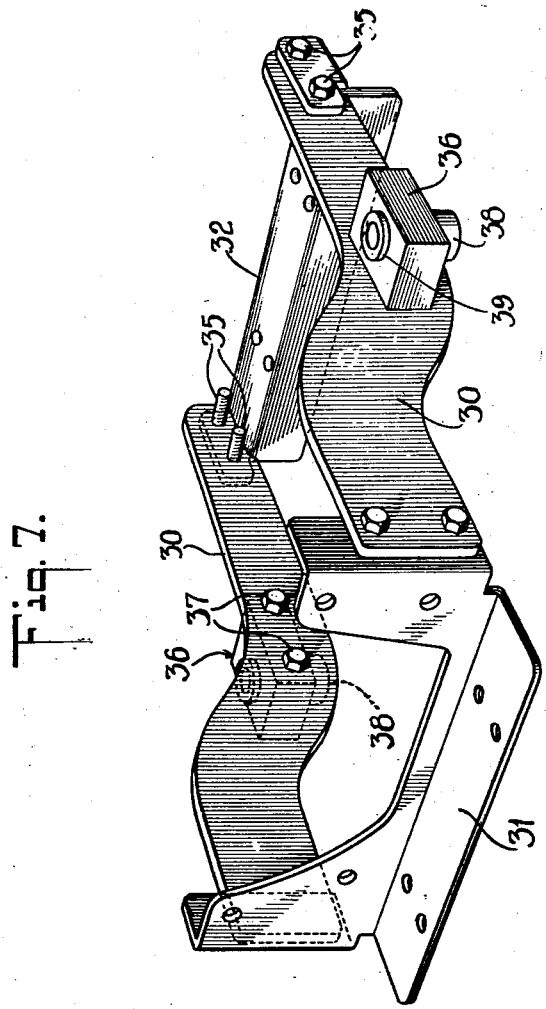

Patented Nov. 26, 1946

2,411,556

UNITED STATES PATENT OFFICE 2,411,556

TRUCK

Charles S. Schroeder, Philadelphia, Pa., assignor to The Yale & Towne Manufacturing Company, Stamford, Conn., a corporation of Connecticut Application February 1, 1945, Serial No. 575,622

15 Claims. (Cl. 214—65)

This invention relates to an industrial truck of the type used in industrial plants for the lifting and transporting of heavy loads. The invention relates more particularly to a truck of the type in which a traction unit is utilized, the traction unit having assembled as an integral part thereof a motor, a transmission and an axle drive unit.

In certain trucks of the particular class, the traction unit has heretofore been secured in a conventional manner as through a series of mounting pads holding the traction unit in place on the main frame. Ulinski, in his Patent No. 2,207,688, owned by The Yale & Towne Manufacturing Company to which this application is assigned, discloses a truck of the class in which the traction unit is mounted for rotation bodily about the axis of the axles of the traction unit, with means secured to a part of the traction unit for accepting the drive torque of the unit. In Ulinski, the truck has tilting uprights on which is mounted a vertically moving carriage, the tilting uprights being mounted on the traction unit and for rotation about the axis of the traction axles.

I have found that it is highly desirable to mount the traction unit for rotation relatively to the frame of the truck as in Ulinski, but about an axis displaced linearily from the axis of rotation of the traction or drive axles. It is then possible to mount the load-carrying uprights of the truck on the traction unit in such a position that the weight of the uprights will tend to rotate the traction unit in a direction opposed to that in which the traction unit tends to rotate because of its weight and form. It is, therefore, seen that the weight of the load and the uprights serves to balance the weight of the traction unit, and thereby to establish a very satisfactory operating condition.

This operating condition makes it possible to use a relatively light and resilient means for securing the traction unit against rotation relatively to the main frame about the pivot shafts through which it is mounted on the main frame. A feature of my invention resides in the means whereby the traction unit is thus secured to the main frame. More particularly, this feature of my invention resides in the utilization of a pair of equalizer bars that may be secured to the traction unit, preferably to the motor thereof, in several places, but which are supported in but two places on the frame of the truck.

Even more particularly, this feature of my invention resides in the utilization of relatively springy equalizer bars and relatively resilient means for securing the equalizer bars to the main frame of the truck.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based, may readily be utilized by those skilled in the art as the basis for the designing of other structures for carrying out the several purposes of my invention. It is important, therefore, that the claims to be granted me shall be of sufficient breadth to prevent the appropriation of my invention by those skilled in the art.

Figure 2:
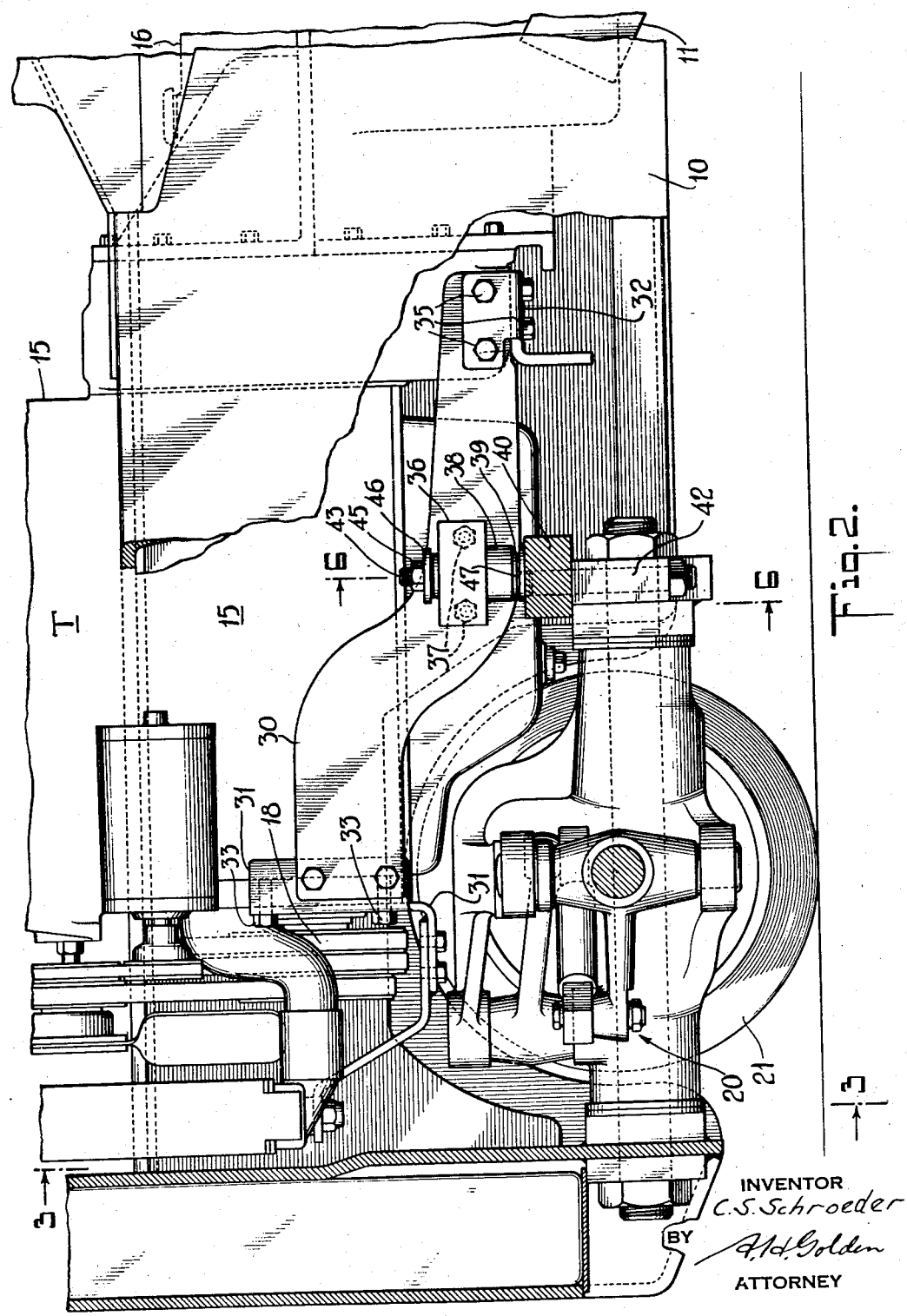
Figure 3:
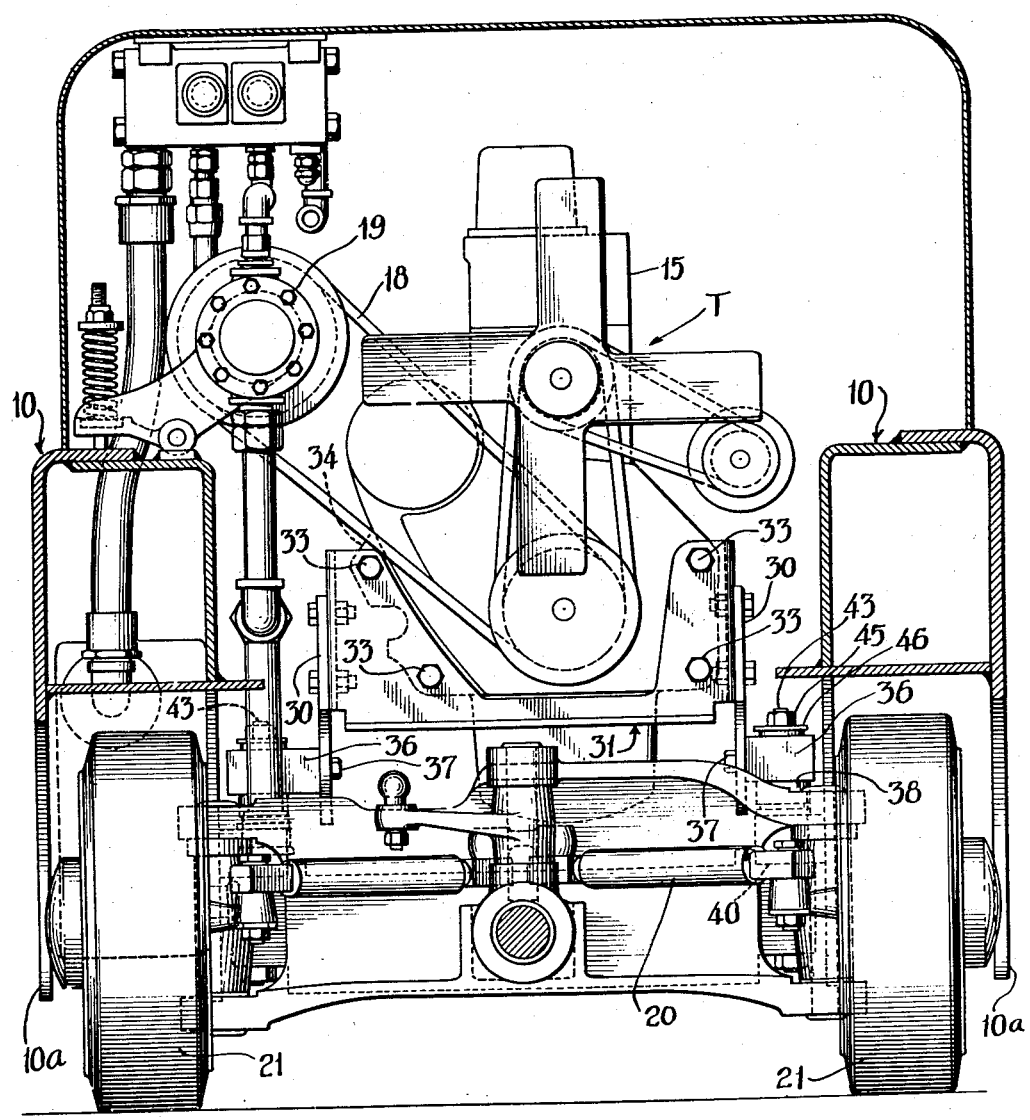

Referring now to the drawings wherein one form of my invention is illustrated, Fig. 1 is an elevation and partial section of a truck embodying my invention. Fig. 2 is an enlarged elevation and partial section of a part of the truck illustrating an equalizer bar at one side of the motor. Fig. 3 is a section taken along lines 3—3 of Fig. 2. Fig. 4 is a view looking downwardly on the main frame of the truck. Fig. 5 is a section taken along lines 5—5 of Fig. 4. Fig. 6 is a section taken along lines 6—6 of Fig. 2. Fig. 7 is a perspective view of the two equalizer bars and the parts secured thereto.

Referring now more particularly to the drawings, and more especially Figs. 1, 4 and 5, the main frame of my truck is designated by reference numeral 10, and is preferably fabricated through the welding of a series of structural steel members. This is a preferred type of fabrication now used in trucks of the class described and it is, of course, subject to change as production volumes vary and as various manufacturing methods are developed. I shall not refer to the details of the construction of the frame 10 of the truck, because my invention is quite independent of the details of the frame. For an understanding of the invention, it is merely necessary to understand that the frame is adapted to mount the entire traction unit for pivotal movement relatively thereto, with means extending between the frame and the traction unit for preventing such pivotal movement except within very narrow limits as determined by resilient means.

For mounting the traction unit for pivotal movement relatively to the main frame, the main frame has a pair of longitudinally extending brackets 11 formed integrally therewith and equipped with bearing surfaces 12 cooperating with bearing surfaces 12a on bearing caps 11a. The axle drive unit of the traction unit T is designated by numeral 14, and has a plate 14a extending therefrom at each lateral side thereof. Stub shafts 13 supported between the surfaces 12 and 12a mount the plates 14a and thus the axle drive unit 14 of the traction unit T for pivotal movement relatively to the brackets 11. The drive wheels W of the traction unit rotate between the brackets 11 and outside frame members 10a.

The traction unit T, in addition to the axle drive 14, includes an internal combustion engine 15 and a conventional transmission 16. These three parts of the traction unit T are secured to form an integral structure that through the stub shafts 13 is rotatable relatively to the main frame 10 and the brackets 11 thereof as already set forth. It will be noted that the axis of rotation is substantially displaced from the axis A of the drive axles of the traction unit.

At this point it may be well to indicate that the motor 15 is of conventional design and is adapted through a belt 18, as shown in Fig. 3, to actuate a pump 19 for developing the hydraulic pressure utilized in operating the usual tilting and lifting mechanism found in trucks of the class described. There is also shown in Fig. 3 steering mechanism 20 for steering the wheels 21, adapted for actuation by the usual steering wheel 22 found in trucks of this type. In Fig. 1 there is shown a gear shift lever 23 and a clutch pedal 24. A brake pedal is, of course, utilized, but is not shown in the drawings.

As has already been indicated generally, some means must be provided for accepting the drive torque of the traction unit T and to hold the unit against rotation about the stub shafts 13. The means preferred by me comprise a pair of equalizer bars best illustrated in Fig. 7, each equalizer bar being designated by reference numeral 30. The front ends of the equalizer bars 30 are connected by a saddle 31 while the rear ends are connected by a rear saddle 32.

The forward saddle 31 may be secured, as best shown in Fig. 3, to parts of the engine 15 by means of the four bolts 33. It will be noted in Fig. 3 that the left hand bolts 33 are secured to a bracket 34 extending from the engine 15 while the right hand bolts 33 enter a part of the engine 15 threaded for that purpose. If desired, the equalizer bars 30 may be formed with flanges so that the bolts 33 will pass through integral portions of the equalizer bars, and thus eliminate the forward connection formed through saddle 31. The rear ends of the equalizer bars 30 are each secured by a pair of bolts 35 to the engine 15 as is probably best seen in Figs. 2 and 7.

Each of the equalizer bars 30 has bolted thereto as is best seen in Figs. 2, 6 and 7, a block 36, bolts 37 being utilized for the purpose. Each block 36 is bored for housing a sleeve 38 that is bonded to a rubber sleeve 39. This rubber sleeve 39 extends above sleeve 38 and also downwardly below the sleeve 38 so as to bear the full weight of the engine and equalizer bar 30 and block 36 when placed on a pad 40. As shown best in Fig. 4, pad 40 is welded to the main frame 10 at 41, there being, of course, two of these pads 40, one for each of the equalizer bars 30. Preferably also, the pads 40 are connected by a reinforcing bar 42. A bolt 43 passes centrally of each rubber sleeve 39 into threaded assembled relation to one of the pads 40. Through a nut 44 and washers 45 and 46 each block 36 is then secured by bolt 43 in assembled relation to one of the pads 40.

It is now apparent that through the equalizer bars 30, the traction unit is secured at two opposed points to the main frame. It is also quite apparent that while thus secured, the equalizer bars may move within the range of movement permitted by the resilient sleeves 39. It is also well to note that the equalizer bars are themselves formed sufficiently thin so as to be springy in nature. Incidentally, further details regarding the construction of the resilient sleeves 39 and their functioning with respect to the sleeves 38 and blocks 36, is not set forth because such rubber sleeves are well known in the art and per se are not my invention. I believe that I have now fully disclosed just how the traction unit is mounted for pivotal movement on the main frame 10 of the truck and just how the traction unit is held against substantial pivotal movement and for the acceptance of the drive torque.

Trucks of the particular class are adapted to carry tilting uprights on which a carriage is mounted for vertical movement. In my truck, such vertical uprights are illustrated in Fig. 1 and are designated by the reference numeral 50. Each upright is formed with a bracket 51 whereby through a stub shaft 52 it is mounted for pivotal movement on one of the plates 14a, it having been previously indicated that the axle drive unit 14 is formed with a plate 14a at each side thereof. For tilting the uprights 50, there is utilized a conventional tilting mechanism that I designate generally by the reference numeral 53, it being thought that further description thereof is unnecessary here. A conventional load carriage 54 is adapted for vertical movement on the uprights 50 through the usual means well known in the art and to which reference need not here be made.

It will be noted that the stub shafts 52 are so positioned relatively to the stub shafts 13, that the weight of the uprights 50 and the carriage 54 will tend to rotate the entire traction unit T clockwise in Fig. 1 relatively to the main frame about the stub shafts 13. On the other hand, the weight of the traction unit will tend to rotate the traction unit counterclockwise relatively to the main frame about the stub shafts 13. Therefore, it is apparent that the weight of the uprights and carriage will tend to balance the weight of the traction unit insofar as the said weights tend to rotate the traction unit clockwise and counterclockwise relatively to the main frame. Because of this relationship of the parts it is possible to use the relatively light and springy equalizer bars 30 with all their attendant advantages, since much of the weight of the traction unit will be balanced by the uprights 50 and the carriage 54.

I believe that the construction and operation of my invention will now be apparent to those skilled in the art.

I now claim:

1. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, and means securing said traction unit to said main frame at a point displaced from said pivot shafts for accepting the drive torque of said traction unit.

2. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, and resilient means securing said traction unit to said main frame at a point displaced from said pivot shafts for accepting the drive torque of said traction unit.

3. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, a mounting member secured to said traction unit at each side thereof, and a single mounting for each of said mounting members at each side of said main frame.

4. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, an equalizer bar secured to the motor of said traction unit at each side thereof, and a single mounting for each of said equalizer bars at each side of said main frame.

5. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, an equalizer bar secured to the motor of said traction unit at each side thereof, and a single resilient mounting for each of said equalizer bars at each side of said main frame.

6. In a truck of the class described, a main frame, a traction unit comprising a motor and a transmission and an axle drive unit having axles for driving traction wheels at each side of said axle drive unit, means secured to portions of said axle drive unit for mounting said traction unit on said main frame, an equalizer bar secured to said traction unit at each side thereof, and a single mounting for each of said equalizer bars at each side of said main frame.

7. In a truck of the class described, a main frame, a traction unit comprising a motor and a transmission and an axle drive unit having axles for driving traction wheels at each side of said axle drive unit, means pivotally mounting said traction unit on said main frame, an equalizer bar secured to said traction unit at each side thereof, and a single mounting for each of said equalizer bars at each side of said main frame.

8. In a truck of the class described, a main frame, a traction unit comprising a motor and a transmission and an axle drive unit having axles for driving traction wheels at each side of said axle drive unit, means pivotally mounting said traction unit on said main frame, an equalizer bar of thin relatively springy construction secured to the motor of said traction unit at each side thereof, and a single mounting for each of said equalizer bars at each side of said main frame.

9. In a truck of the class described, a main frame, a traction unit comprising a motor and a transmission and an axle drive unit having axles for driving traction wheels at each side of said axle drive unit, means pivotally mounting said traction unit on said main frame, an equalizer bar secured to the motor of said traction unit at each side thereof, and a single resilient mounting for each of said equalizer bars at each side of said main frame.

10. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, means securing said traction unit to said main frame at a point displaced from said pivot shafts for accepting the drive torque of said traction unit, a pair of carriage supporting uprights mounted on said axle drive unit at each side thereof, the points of mounting of said uprights being so related to said opposed pivot shafts that the weight of said uprights will tend to rotate said traction unit about said pivot shafts in a direction opposed to that in which said traction unit tends to rotate by reason of its own weight.

11. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, means securing said traction unit to said main frame at a point displaced from said pivot shafts for accepting the drive torque of said traction unit, a pair of carriage supporting uprights, means mounting one of said uprights for tilting movement on each side of said axle drive unit, the point of mounting of said uprights being so related to said opposed pivot shafts that the weight of said uprights will tend to rotate said traction unit about said pivot shafts in a direction opposed to that in which said traction unit tends to rotate by reason of its own weight.

12. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, a pair of carriage supporting uprights mounted on said rear axle drive unit at each side thereof, the points of mounting of said uprights being so related to said opposed pivot shafts that the weight of said uprights will tend to rotate said traction unit about said pivot shafts in a direction opposed to that in which said traction unit tends to rotate by reason of its own weight.

13. In a truck of the class described, a main frame, a traction unit comprising a motor and a transmission and an axle drive unit having axles for driving traction wheels at each side of said axle drive unit, a pair of opposed pivot shafts mounting said axle drive unit and therefore said entire traction unit for pivotal movement on opposed parts of said main frame and with said pivot shafts displaced linearly from the axis of the axles of said drive unit, a pair of carriage supporting uprights, means mounting one of said uprights for tilting movement on each side of said rear axle drive unit, the points of mounting of said uprights being so related to said opposed pivot shafts that the weights of said uprights will tend to rotate said traction unit about said pivot shafts in a direction opposed to that in which said traction unit tends to rotate by reason of its own weight.

14. In a truck of the class described, a main frame, a traction unit comprising a motor and a transmission and an axle drive unit having axles for driving traction wheels at each side of said rear axle drive unit, means pivotally mounting said axle drive unit on said main frame whereby said entire traction unit may pivot on said main frame, means for accepting the torque of said traction unit relatively to said main frame and for holding said traction unit against pivoting movement because of the disposition of its weight relatively to said means mounting it on said main frame, a pair of uprights, and means tiltably mounting said uprights on said axle drive unit at points where the weight of said uprights will tend to rotate said traction unit on its pivotal mounting in a direction opposed to that in which it tends to be rotated by the disposition of its weight.

15. In a truck of the class described, a main frame, a traction unit comprising a motor and a transmission and an axle drive unit having axles for driving traction wheels at each side of said axle drive unit, means pivotally mounting said axle drive unit on said main frame whereby said entire traction unit may pivot on said frame, resilient means for accepting the torque of said traction unit relatively to said main frame and for holding said traction unit against substantial pivoting movement because of the disposition of its weight relatively to said means mounting it on said main frame, a pair of uprights, and means tiltably mounting said uprights on said axle drive unit at points where the weight of said uprights will tend to rotate said traction unit on its pivotal mounting in a direction opposed to that in which it tends to be rotated by the disposition of its weight.

CHARLES S. SCHROEDER.